(12) United States Patent
Waldvogel

(10) Patent No.: US 7,437,504 B2
(45) Date of Patent: Oct. 14, 2008

(54) READING A STORAGE MEDIUM

(75) Inventor: Marcel Waldvogel, Stein am Rhein (CH)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 11/186,566

(22) Filed: Jul. 21, 2005

(65) Prior Publication Data

US 2006/0020749 A1 Jan. 26, 2006

(30) Foreign Application Priority Data

Jul. 23, 2004 (EP) ............................ 04405473

(51) Int. Cl.
*G06F 12/00* (2006.01)
(52) U.S. Cl. ...................... 711/112; 711/156; 711/165; 711/170
(58) Field of Classification Search ................ 711/112, 711/156, 165, 170
See application file for complete search history.

(56) References Cited

U.S. PATENT DOCUMENTS

| 5,751,942 A | * | 5/1998 | Christensen et al. ............ 714/38 |
| 5,802,593 A | * | 9/1998 | Grimsrud .................... 711/165 |
| 5,890,205 A | * | 3/1999 | Grimsrud et al. ............. 711/112 |
| 5,920,896 A | * | 7/1999 | Grimsrud et al. ............. 711/165 |
| 6,317,875 B1 | * | 11/2001 | Grimsrud et al. ............. 717/174 |
| 6,678,838 B1 | * | 1/2004 | Magro ........................ 714/42 |
| 2002/0120815 A1 | * | 8/2002 | Zahavi et al. ................ 711/118 |
| 2003/0221052 A1 | * | 11/2003 | Yechiel ....................... 711/111 |
| 2004/0088480 A1 | * | 5/2004 | Fox et al. ..................... 711/112 |
| 2005/0204095 A1 | * | 9/2005 | Dayan et al. ................. 711/112 |
| 2005/0289312 A1 | * | 12/2005 | Ghosal et al. ................ 711/167 |

OTHER PUBLICATIONS

Ng, "Improving Dsik Performance Via Latency Reduction," pp. 22-30, IEEE, Jan. 1991.*
Yu et al., "Trading Capacity for Performance in a Disk Array," ACM, pp. 1-16, Oct. 2000.*
Akyurek et al., "Adaptive Block Rearrangement," ACM, pp. 1-33, Apr. 1993.*

* cited by examiner

*Primary Examiner*—Stephen C Elmore
(74) *Attorney, Agent, or Firm*—Louis P. Herzberg

(57) ABSTRACT

Provides methods, systems and devices for reading a storage medium. A method for reading a storage medium according to the invention includes the following steps: First, it is determined if an access sequence requested by an application to data stored on the disk drive is a part of a known access sequence. Then, if the requested access sequence is part of a known access sequence, the data are read from a data arrangement stored on the medium in addition to an original data arrangement which additional data arrangement differs in its arrangement of data from the arrangement of data in the original data arrangement.

20 Claims, 3 Drawing Sheets

READING A STORAGE MEDIUM

TECHNICAL FIELD

The present invention relates to a method and a device for reading a storage medium.

BACKGROUND OF THE INVENTION

In the past, performance levels of microprocessor-based computer systems have increased dramatically. In particular, the operating speed of microprocessors has increased from some 100 kHz to several GHz. However, latency times for disk drive accesses have barely improved over the past few years, especially when compared to other speed improvements in the storage and computing fields. As a result, users are often deprived of the full benefit of the increased performance by the microprocessors. For example, when an application is started up, the large majority of time is often spent on loading data needed by an application into the memory from the disk drive. This means that the performance experienced by the user is often dominated by parameters of the storage system, not by the microprocessor. The user then often does not see any difference in performance whether his is using a system equipped with e.g. a 500 MHz microprocessor or a 1 GHz microprocessor. Therefore, the invention aims at improving latency times for storage media in general, and disk drives in particular, for selected, common or time-critical read accesses.

In the prior art U.S. Pat. No. 5,802,593, a method and apparatus for improving disk drive performance is described. The apparatus is programmed with a plurality of programming instructions for generating, if possible, an alternative disk block allocation for a current disk block allocation that will yield improved overall access time for a sequence of disk accesses. In some embodiments, the programming instructions include a logic for tracing a sequence of disk accesses to determine the current disk block allocation, a logic for generating the alternative disk block allocation, if possible, using the trace results, and a logic for effectuating the alternate disk block allocation, if generated. In one particular embodiment, the logic for generating the alternative disk block allocation employs a random search approach, while in another embodiment; the logic for generating the alternative disk block allocation employs a heuristic approach.

In the U.S. Pat. No. 5,890,205 an optimized application installation using disk block relocation is described. A computer system is programmed with a plurality of programming instructions for implementing a software function, having an installation utility with logic for generating, if possible, an alternative disk block allocation for a current disk block allocation that will yield improved overall access time for a sequence of disk accesses. In some embodiments, the logic includes logic for tracing a sequence of disk accesses to determine the current disk block allocation, logic for generating the alternative disk block allocation, if possible, using the trace results, and logic for effectuating the alternate disk block allocation, if generated. In one particular embodiment, the logic for generating the alternative disk block allocation employs a random search approach, while in another embodiment; the logic for generating the alternative disk block allocation employs a heuristic approach.

In the U.S. Pat. No. 5,920,896 an apparatus for reducing operating system start-up/boot time through disk block reallocation is described. Therefore, a computer system is equipped with an operating system having a tracer driver for generating trace data including disk locations accessed for disk accesses made by various components of the operating system during system startup/boot time. The tracer driver is loaded at an initial phase of system start-up. The computer system is further equipped with a companion disk block relocation driver for generating, if possible, an alternative disk block allocation for a current disk block allocation that will yield improved overall access time for a sequence of disk accesses. In some embodiments, the disk block relocation driver includes logic for tracing the sequence of disk accesses to determine the current disk block allocation, logic for generating the alternative disk block allocation, if possible, using the trace results, and logic for effectuating the alternate disk block allocation, if generated. In one particular embodiment, the logic for generating the alternative disk block allocation employs a random search approach, while in another embodiment; the logic for generating the alternative disk block allocation employs a heuristic approach.

Finally, in the document U.S. Pat. No. 6,317,875 B1 a method and apparatus for improving execution time performance through disk block relocation is depicted. The execution time performance of one or more applications that are dynamically loaded for execution post initial loading is improved by invoking selected parts of the one or more applications for execution post initial loading to allow disk locations accessed and the order the disk locations are accessed to load the selected parts of the one or more applications for execution post initial loading to be traced, and in turn, based at least in part on the order the disk locations are accessed, alternate disk locations to be identified to store the selected parts of the one or more applications to reduce time required to load the selected parts of the one or more applications for execution post initial loading.

The embodiments explained in the above mentioned patents are all based on the same basic idea: the program execution is traced and then the blocks are reallocated, i.e. moved from one place to another, to improve the access time. The embodiments differ in the actual mechanisms used and applications targeted, but all rely on the same principle mentioned.

In "Improving Disk Performance Via Latency Reduction", Spencer W., IEEE Transactions On Computers, Vol. 40, No. 1, January 1991, it is proposed to provide a second disk comprising a copy of data in order to improve access time. So does "Trading Capacity for Performance in a Disk Array", Xiang Yu et al., Proceedings Fourth Symposium on Operating Systems Design and Implementation, October 2000.

In "Adaptive Block Rearrangement", Sedat Akyuerek and Kenneth Salem, Proceedings of the Ninth International Conference on Data Engineering, Apr. 19-23, 1993, Vienna, Austria, data blocks are copied from their original locations to preserved space near the middle of the disk. Seek times should be cut.

The approach in the prior art is mainly targeted at single-threaded/single-process operations, where the sequence of events does not change and a single data block is mostly used as part of a single sequence. When multiple threads of execution exist, e.g. multiple operations are commonly started in parallel, such as the system start-up in a multitasking environment or a user login/multiple application starts, the approach in the prior art may not be efficient, as the improved (and thus changed) timing of disk accesses could lead to a different execution order and thus a different block request order. Therefore, it is necessary in this context to generously prefetch data sequentially, in order to avoid more seek operations. Also, an iterative retracing may be required to adapt to the changing request order as a result of block rearrangement.

SUMMARY OF THE INVENTION

Therefore, according to one aspect of the invention, there is provided a method for reading a storage medium. According to another aspect of the present invention, there is provided a device for reading a storage medium A method for reading a storage medium according to the invention comprises the following steps: determining whether an access sequence requested by an application to data stored on the medium is part of a known access sequence; if the requested access sequence is part of a known access sequence, reading the data from a data arrangement stored on the medium in addition to an original data arrangement which additional data arrangement differs in its arrangement of data from the arrangement of data in the original data arrangement.

A device for reading a storage medium according to the invention comprises an evaluation unit for determining whether an access sequence requested by an application to data stored on the medium is part of a known access sequence, and an execution unit for reading data from a data arrangement stored on the medium in addition to an original data arrangement, if the requested access sequence is part of a known access sequence, which additional data arrangement differs in its arrangement of data from the arrangement of data in the original data arrangement.

In a further embodiment, additional data arrangements comprising matching subsequences of data are merged to one copy. This embodiment may be executed upon units of matching data exceeding a given threshold, as it might not be desired to merge additional data arrangements comprising only e.g. two data items in the same order. By merging partly matching additional data arrangements, storage capacity for additional data arrangements as well as storage for administrating known access sequences can be reduced. As for the residuals parts of each additional data arrangements which are not merged, these residual parts can for example be stored as further additional data arrangements together with generating a corresponding known access sequence.

In a further embodiment, the access sequence, which has been determined in the preparation phase, is stored as known access sequence together with a link to the corresponding additional data arrangement as when it is of interest for a requesting application to read the data from an additional data arrangement instead of the original data arrangement, the location of the additional data arrangement on the storage medium is given by such link.

According to another aspect of the present invention, there is provided a computer program element comprising program code for causing steps of any one of the methods as introduced before to be executed when said program is run on a processing unit. The function as introduced by the method and as may be implemented by the computer program element can advantageously be implemented in an operating system.

BRIEF DESCRIPTION OF THE DRAWINGS

The invention and its embodiments will be more fully appreciated by reference to the following detailed description of illustrative embodiments in accordance with the present invention when taken in conjunction with the accompanying drawings, in which.

REFERENCE SIGNS

Figure 1A:
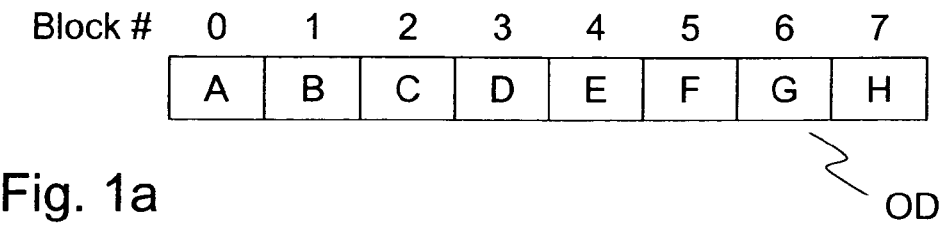
FIG. 1a shows an example of an original data arrangement stored on a disk drive.

OD original data block
C1 first data copy
C2 second data copy
V1 first application
V2 second application
A-H data
0-7 data block numbers
10-17 data block numbers
20-27 data block numbers
31 copy unit
32 evaluation unit
33 selection unit
34 execution unit

DETAILED DESCRIPTION OF THE INVENTION

The present invention provides methods, apparatus and systems for reading a storage medium. There is also provided a device for reading a storage medium. An example of a method for reading a storage medium according to the invention comprises the following steps. Determining whether an access sequence requested by an application to data stored on the medium is part of a known access sequence. If the requested access sequence is part of a known access sequence, reading the data from a data arrangement stored on the medium in addition to an original data arrangement which additional data arrangement differs in its arrangement of data from the arrangement of data in the original data arrangement.

An example of a device for reading a storage medium according to the invention comprises an evaluation unit for determining whether an access sequence requested by an application to data stored on the medium is part of a known access sequence, and an execution unit for reading data from a data arrangement stored on the medium in addition to an original data arrangement, if the requested access sequence is part of a known access sequence, which additional data arrangement differs in its arrangement of data from the arrangement of data in the original data arrangement.

The methods and devices help to improve performance of operating the storage medium, particularly to improve the access time, wherein the performance can be adapted and optimized for different applications, e.g. the access time can be adapted for each application separately. The storage medium can be embodied e.g. as magnetic storage medium as used in a disk drive or a tape drive, an optical storage medium such as a CD or DVD, or a mechanical storage medium such as used in local probe storage arrays. This listing only gives examples of appropriate storage media. The invention is in particular useful for head/media combinations in which the head can jump to different locations on the medium for reading or writing purposes, and in particular for storage concepts where data are not necessarily stored on the medium in the sequence to be accessed for reading but where data can be scattered on the storage medium and consequently the read head has to jump between different locations on the medium for reading a desired sequence of data.

Typically, the access sequence requested is compared to known access sequences. Such known access sequences themselves or information about known access sequences are advantageously stored either on the storage medium itself or elsewhere. Such known access sequences can form a repository for access sequences requested in the past. Typically, for every known access sequence, an additional data arrangement was provided in the past on the storage medium. The term additional reflects that such additional data arrangement is deposited on the storage medium in addition to the original data which the additional data arrangement is derived from. In the additional data arrangement the data are arranged in a different way, i.e. a different order, than in the original data arrangement. The data in the additional data arrangement are arranged according to the known access sequence. In a previous preparation phase this known access sequence was determined as access sequence requested by an application which access sequence was rated to be worth being stored on the storage medium as additional data arrangement in addition to the—most likely scattered—original data in order to improve access time to such data whenever this access sequence—stored as known access sequence—is requested again. Then, the request is handled by reading the requested access sequence from the additional data arrangement. It is emphasized, however, that there is no need that the entire access sequence as requested by the application is present as known access sequence. Even if only a part of the requested access sequence is known, it is beneficial to read the data from an additional data arrangement instead of the original data arrangement. Note that the additional data arrangement might have been identical to the known access sequence at the time of storing. However, as there might have occurred write operations with regard to the original data and—depending on the handling of such write operations—on the additional data arrangement, the additional data arrangement might not exactly match the known access sequence at the time of the application's request any longer. Nevertheless, such additional data arrangement might still be the better choice to read from than the original data arrangement since at least parts of the additional data arrangement might still match with the requested access sequence. Further, it is understood that the additional data arrangement does not necessarily contain all the data of the original data arrangement. Some of the data of the original data arrangement might appear multiple times in the additional data arrangement; some might be omitted in the additional data arrangement. Hence, the original data arrangement can be understood as a repository for data to be arranged in the additional data arrangement. However, each piece of data as such in the additional data arrangement advantageously is a copy of that piece of data in the original data arrangement. In turn, the original data arrangement is part of a data arrangement typically stored on the storage medium when an application setup is performed or an application is downloaded on the storage medium. The additional data arrangement is stored in the same storage medium as the original data arrangement, i.e. the additional data arrangement is read by the same read head as the original data arrangement. Further advantageous developments of the invention arise from the characteristics indicated in the dependent patent claims.

Advantageously, the arrangement of data in the additional data arrangement matches an arrangement of data in the known access sequence. However, reflecting what is said above, the arrangement of data in the additional data arrangement can match at least partly an arrangement of data in the known access sequence. If the requested access sequence is a part of a known access sequence, but there is no additional data arrangement available in which the data are arranged in the known access sequence, the data are fetched from an additional data arrangement whose data sequence is closest to the known access sequence or alternatively thereto, from an additional data arrangement on the storage medium whose data can be accessed with (expected) least cost.

If the requested access sequence is not a part of a known access sequence, then, preferably, the data are read from the original data arrangement on the storage medium, herewith accepting multiple hops to eventually scattered data on the medium. Alternatively, an additional data arrangement considered suitable for this access sequence may be utilized. However, upon such condition, alternatively or in addition to the proposed reading process, such requested access sequence can be a trigger to derive a known access sequence from and deposit an additional data arrangement comprising data arranged according to such known access sequence on the storage medium. Typically, the process of inserting different additional data arrangements on the storage medium is called preparation phase in general. The above condition leading to an insertion of new additional data arrangements constitute only one of many different insertion policies. While the following paragraphs describe such preferred preparation phase in general, other preferred policies of applying such preparation phase are following.

Advantageously, the method according to the invention comprises a preparation phase. In this phase, an access sequence in which data are read by an application from the disk drive is determined. Such access sequence is stored as known access sequence. An arrangement of data is then stored on the disk drive as additional data arrangement, wherein in the additional data arrangement the data are arranged according to the determined/known access sequence.

Typically the preparation phase is processed separately from the operation mode, but the preparation options can be done in parallel with other accesses. Preferably, when storing applications on the storage medium the preparation phase can be integrated into the application storing phase, also called setup phase. For example, any software application itself can be prepared to trigger determining access sequences causing storage of corresponding additional data arrangements. Alternatively, an application setup program can already suggest selected access sequences for treatment according to the preparation phase. In another embodiment, as mentioned above, new additional data arrangements can be inserted during operation of an application, e.g. triggered by a requested access sequence not known to the reading device before. According to another embodiment, a monitoring software can cause insertion of new additional data arrangements on an event triggered basis or a regular basis, for such a reading device, or for many reading devices in a distributed storage system.

In an embodiment of the method according to the invention, in the preparation phase for each application, whose data access time to the disk drive shall be improved, an additional data arrangement is stored on the disk drive. Such additional data arrangements might at least partly include the same data, however arranged in different orders in order to satisfy the corresponding access sequence. As for updating, in a further embodiment of the method according to the invention the preparation phase is processed repeatedly. With that, the operation, i.e. the data access, can be further optimized.

In a further embodiment, additional data arrangements comprising matching subsequences of data are merged to one copy. This embodiment may be executed upon units of matching data exceeding a given threshold, as it might not be desired to merge additional data arrangements comprising only e.g. two data items in the same order. By merging partly matching additional data arrangements, storage capacity for additional data arrangements as well as storage for administrating known access sequences can be reduced. As for the residuals parts of each additional data arrangements which are not merged, these residual parts can for example be stored as further additional data arrangements together with generating a corresponding known access sequence. The additional data arrangement as stored before the merging procedure can then be deleted. A known access sequence formerly associated to the additional data arrangement before merging is then split up accordingly into two or more new known access sequences, one of such new access sequences associated to the merged part of additional data arrangements, the other part/s associated to the residuals of this additional data arrangement. Of course, such procedures for optimizing the number, length and or structure of additional data arrangements are preferably performed by an administrative function of the method respectively the device which might verify the existing additional data arrangements on a regular basis. However, any basis for such optimization might of course not only be the additional data arrangement but alternatively or in addition to the known access sequences.

In a further embodiment, the access sequence, which has been determined in the preparation phase, is stored as known access sequence together with a link to the corresponding additional data arrangement as when it is of interest for a requesting application to read the data from an additional data arrangement instead of the original data arrangement, the location of the additional data arrangement on the storage medium is given by such link. Whether the link points to an additional data arrangement in which the data are arranged in the exact order of the known access sequence or to an additional data arrangement in which the data are arranged roughly according to the known access sequence, can be subject to the optimization criteria. Any information comprising known access sequences and links to corresponding additional data arrangements are preferably stored in a table. E.g., only the administrative function can be given write access to this table for updating links or introducing or deleting additional data arrangements.

The following embodiments advantageously give decision criteria for adding an additional data arrangement to the storage medium: In a first embodiment, an additional data arrangement is generated, if the amount of data to be rearranged is below a given threshold. Furthermore, the decision whether an additional data arrangement is generated can depend on a desired access time. In another embodiment, the decision whether an additional data arrangement is generated can depend on the priority which an access to such data has. Furthermore, the decision whether an additional data arrangement is generated depends on real-time conditions under which an access to the data is made. The decision whether a copy of the data is generated can also depend on the available storage for storing the envisaged additional data arrangement. The decision can also depend on the time available for writing the additional data arrangement to the storage medium, in particular when the process of inserting of an additional data arrangement is to be executed during executing an application. Any decision can also depend on the seek distance, based on the deliberation that a seek distance between an additional data arrangement stored somewhere on the storage medium remote from the rest of data which have to be fetched for executing the respective application might level the benefit of having the data to be accessed arranged in a sequence as requested.

If a write operation occurs to data being part of the original data arrangement either both the original data arrangement and the additional data arrangement can be modified or the original data arrangement is modified and the additional data arrangements are made or marked invalid. Under the first option, the table comprising the known access sequences is advantageously modified according to the amendments introduced, as a known access sequence may be modified in the course of modifying the data arrangements. Under the second option, the table may also be advantageously updated since the link/pointer to the additional data arrangement is not valid any longer and thus can be deleted.

According to another aspect of the present invention, there is provided a computer program element comprising program code for causing steps of any one of the methods as introduced before to be executed when said program is run on a processing unit. The function as introduced by the method, may be implemented by the computer program element can advantageously be implemented in an operating system.

In the following, the term "application" shall comprise any kind of operations which access data from a storage medium. In this context, an application may be for example a program, in particular an application program or parts of, an operating system (OS) or parts of, e.g. its start-up, or e.g. a frequent or time-critical database query.

Although the following embodiments are described in relation to disk drives, any other storage concept suitable can be subject to these embodiments. An improvement of disk drive performance is achieved by copying data to be read for a particular application which data can be scattered around the disk as a storage medium into a contiguous space on the disk, which can then be read with minimal seek latencies, thereby improving access speed, wherein typically, it is more important to reduce the number of seek operations than their distance. For multiple common operations, which possibly involve the same data, multiple rearranged data copies may be created, wherein each rearrangement of data copies—which is also referred to as additional data arrangement—is optimized for a determined operation.

The seek time or seek latency is generally defined as the time between the occurrence of a read command and the beginning of reading, i.e. essentially the time which is necessary for positioning the read/write head of the disk drive. The latter depends on the actual distance between the current position of the read/write head and the address of the data block which shall be accessed.

The general idea is that parts of the disk space are set statically or dynamically aside to contain rearranged data. When the speed of a particular operation mostly involving reads should be optimized, a trace of the disk reads involved is first collected for that operation. This step is equivalent to determine an access sequence in which data are read by such operation. An access sequence typically forms part of the entire trace of an operation. Then, the data are copied in the order of the determined access sequence—also referred to as known access sequence—into the area on the disk provided for that operation. When a reoccurrence of the traced operation or the occurrence of a potentially similar operation is identified, the data will be served from the serialized rearrangement of data instead of the scattered original, eliminating most seek latencies, thus greatly improving performance. However, the data of the scattered original remain stored at their origin locations.

If multiple of such serialized data arrangements in addition to the scattered original data arrangement may exist, each additional data arrangement can be provided and/or optimized for a particular operation/application. Therefore, multiple operations and the corresponding requests for data stored on the disk may be optimized by providing multiple additional data arrangements on the disk.

FIG. 1a shows an example of eight data blocks on the disk of a disk drive. A data block typically represents a particular position on the disk for storing data of predetermined length. The data blocks are numbered from 0 to 7, wherein each data block contains data. In the example the data A to H are stored in the data blocks 0 to 7 in a first sequence. This data arrangement of data A to H in the data blocks 0 to 7 is called in the following the original data arrangement OD.

Figure 1B:
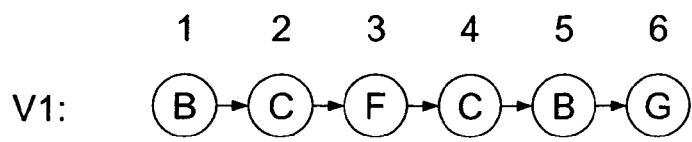
FIG. 1b shows an additional data arrangement derived from data of the original data arrangement according to FIG. 1a, stored on the disk drive, wherein the sequence of the data in the additional data arrangement is adapted to a first application.
Figure 1B:
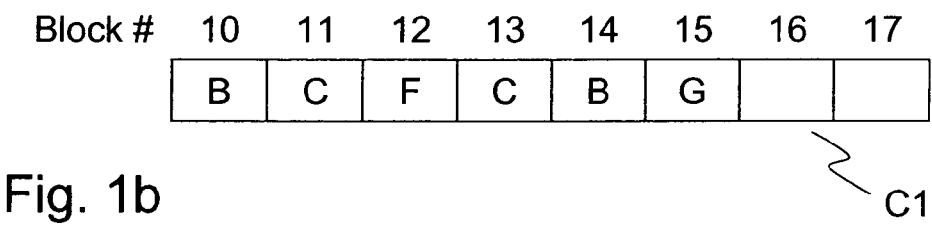

In FIG. 1b an additional data arrangement C1 derived from the data arranged in the data blocks 0 to 7 of FIG. 1a is depicted, wherein the additional data arrangement C1 is also stored on the disk drive—in data blocks 10 to 17—, and wherein the sequence of the data in the additional data arrangement is adapted to serve a first application V1. The sequence in which the data following each other in the additional data arrangement C1 is a timely sequence in which the data are requested to be accessed by the first application V1. As can be seen, the additional data arrangement for serving application V1 not necessarily contains the entirety of data contained in the original data arrangement in data blocks 0 to 7. However, generally, an additional data arrangement is based on data arranged in the original data arrangement. In this example, the application V1 first accesses data B, then data C, F, again data C, then B and finally data G. If the application can fetch the data in this sequence from the disk drive by accessing the data blocks 10 to 15 the latency time for fetching these data gets shorter than if the data would have to be fetched from the data blocks 0 to 7. The reason is that the data blocks 10 to 15 can be accessed continuously and typically only one seek operation for settling the read head at the beginning of data block 10 to start data transfer is necessary. Any access to the data B, C, F, C, B, and G as arranged in data blocks 0 to 7 however, needs five seek operations—which includes five resettlements of the read head—, the first one for reading data block 1, the second one for reading data block 5, the third one for reading data block 2, the fourth one for reading data block 1, and the fifth one for reading data block 6. Assuming that one seek operation takes 10 ms it gets obvious that by using the data blocks 10 to 15 for delivering the data for the application V1 the saving of time is substantially.

Figure 1C:
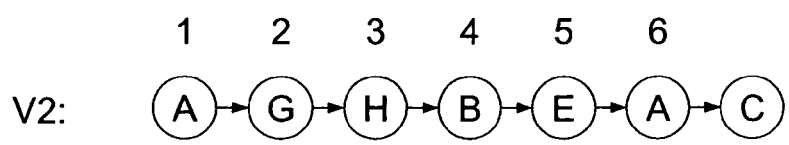
FIG. 1c shows an additional data arrangement derived from data of the original data arrangement according to FIG. 1a, stored on the disk drive, wherein the sequence of the data in the additional data arrangement is adapted to a second application.
Figure 1C:
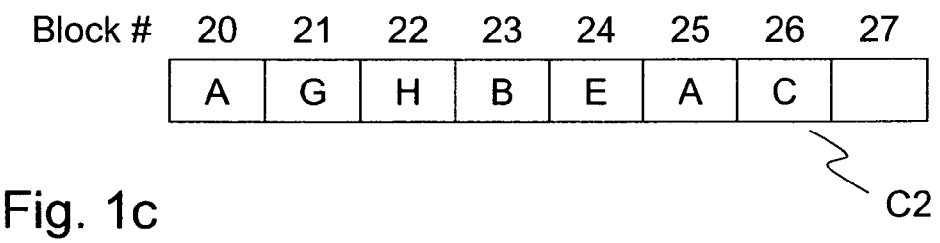

Assuming a second application V2 requests data for access in an access sequence shown in FIG. 1c then an additional data arrangement C2 based on the data contained in the data blocks 0 to 6 of FIG. 1a is stored on the disk, wherein the sequence of the data is arranged according to the needs of the second application V2. As the second application V2 needs first data A, then data G, H, B, E, A, and finally data C, these data are stored in this sequence as additional data arrangement C2 on the disk drive. Also in this case the seek time can be reduced substantially. While the conventional way of fetching the data from data blocks 0 to 7 needs six seek operations, the method according to the invention needs only one, namely for seeking data block 20.

Often it may happen that several applications V1, V2 to Vn are running simultaneously on the same microprocessor and need the same original data from the disc drive as fast as possible. For this case several data arrangements of the original data in addition to the original data arrangement can be generated, wherein the data sequence of each additional data arrangement is aligned according to the requested access sequence required for the corresponding application V1, V2 or Vn.

Figure 2:
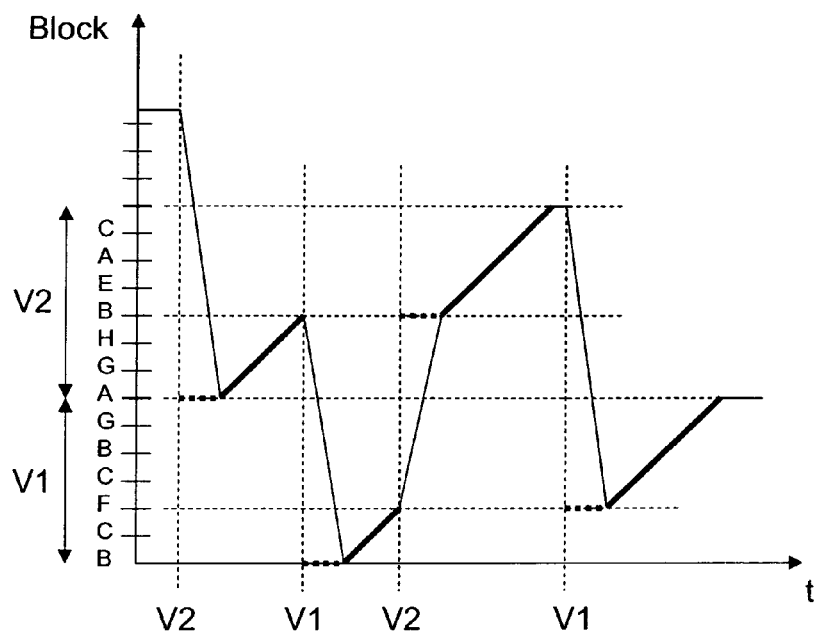
FIG. 2 shows a diagram for the explaining how two different applications fetch data from the disk drive when using an embodiment of the method according to the invention.

An example of how the data access is carried out when two different applications V1 and V2 are running in parallel on the same processor is illustrated in FIG. 2. In the diagram of FIG. 2 the abscissa forms the time t and characterizes the points of time when the applications V1 and V2 need data. On the ordinate the sequence of data in which they are stored on the disk drive is illustrated. When the application V2 needs data from the disk drive, usually a seek operation is processed. After the read/write head is positioned at the beginning of the data block containing data A the data are continuously read out until the application V1 sends a read command to the disk drive. Now the read operation for application V2 is interrupted and a further seek operation is carried out for fetching the data B, and C for the application V1. A little bit later the application V2 again needs data from the disk drive and therefore generates a read command. The read/write head is positioned by a seek command at that data block which contains data B and the data are again read out continuously. Finally the application V1 generates a further read command for accessing the data F to G. After a new seek operation these data can also be read out continuously. Even because the data in the additional data arrangements C1 and C2 are not ordered in the same sequence as they are in the original data arrangement shown in FIG. 1a, but optimized for the applications V1 and V2 respectively, the performance of the disk drive is improved by the access to the two additional data arrangements C1 and C2.

For the system to determine the correspondence between applications V1 to Vn and additional data arrangements C1 to Cn and their location on the disk, appropriate mapping information is provided at a well-known location on a non-volatile media, such as the disk itself.

Figure 3:
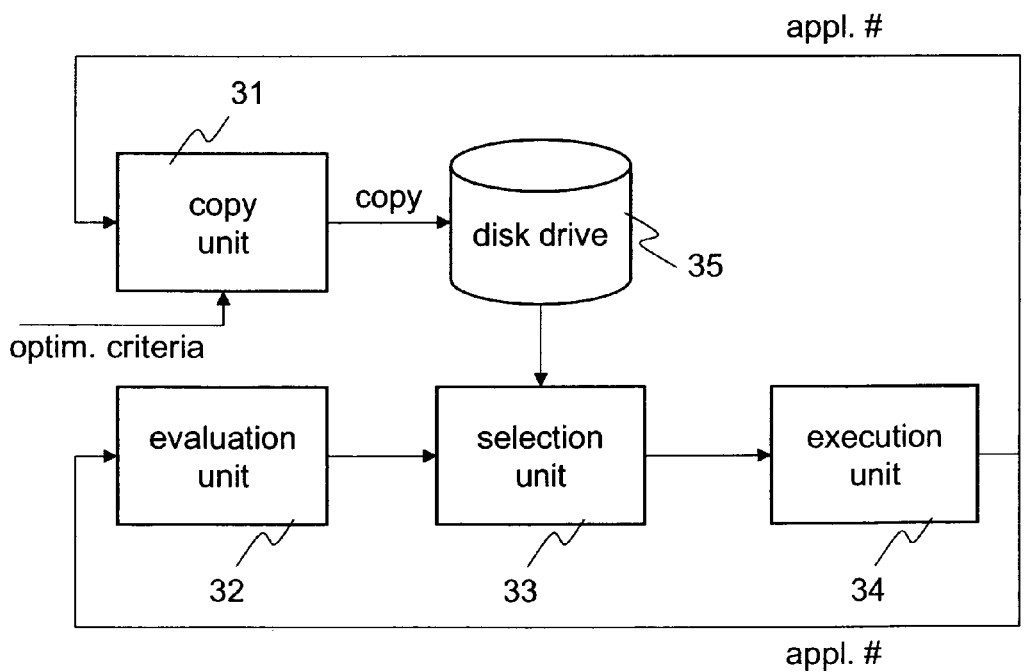
FIG. 3 shows a block diagram of a device for improving the disk drive performance according to the invention.

FIG. 3 shows a block diagram of a device for reading data from the disk drive which is suitable for processing different embodiments of the method according to the invention. With the help of a copy unit 31 an access sequence of a determined application appl# is found out and a data arrangement including the corresponding data of the access sequence as determined, optimized by means of optimization criteria, is stored on the disk drive in addition to the original—and most likely scattered—arrangement of data. If now an application runs on a system—e.g. a computer system reading from the disk drive—it is determined by means of an evaluation unit 32 whether the access sequence requested by this application to data stored on the disk drive is a part of a known access sequence. The result of this evaluation is provided from the evaluation unit 32 to a selection unit 33. If the access to data on the disk drive is a part of a known access sequence, the selection unit 33 selects that additional data arrangement in which the data are arranged closest to the determined known access sequence and fetches these data from the selected one of additional data arrangements on the disk drive 35 for serving a reading process of the actual running application in execution unit 34. All these units are advantageously embodied in software, can also be embodied in hardware or in any combination of software and hardware.

Figure 4:
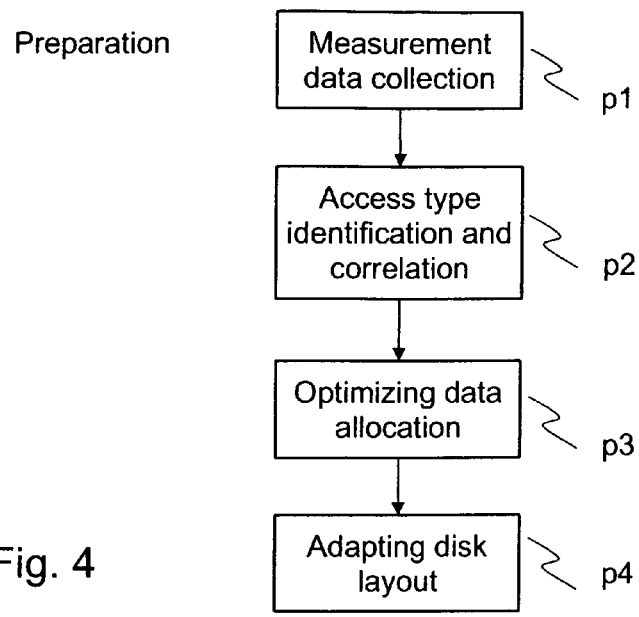
FIG. 4 shows a flow chart of a preparation mode of an embodiment of the method according to the invention.

A flow diagram of a preparation mode, which is also called preparation phase, of the method according to the invention is depicted in FIG. 4. In this mode first data describing access patterns are measured and collected in step p1. The traces collected will be analyzed for the type of access, namely read or write, and their respective frequencies, see step p2. This information will help to determine if data should be copied into an additional data arrangement on the storage medium, as widely copied data which have to be re-written or modified very frequently may negatively impact overall performance since all the different additional data arrangements then may also want to be updated or modified. Again, this is subject to optimization criteria which optimization criteria include determining in the preparation phase whether an additional data arrangement shall be generated and stored on the disk drive. E.g., if the real-time demands during the read operation are very strict, it might still be useful to have widely copied data, even if these data are subject to frequent modifications. Optimization criteria are discussed below. If the trace(s) includes multiple similar operations or identical operations with different timings, these multiple instances are correlated, providing the necessary information for determining an allocation that suits all sub-traces. Afterwards the data allocation is optimized, see step p3. This means that the sequence of the data and the number of data arrangements is adapted to the corresponding applications. There, the disk layout is also adapted. For the optimization different optimization rules may be applied. The optimization rules may include cost functions with which different parameters can be taken into account. Some of these parameters are set forth in the following. Finally, the media layout is adapted in step p4.

In the following parameters depending on an arrangement of data in a known access sequence are listed. The examples below are given for the case where the data is stored on a disk drive but can easily be generalized to other media with different properties.

g size of the known access sequence. An access subsequence is a subset of an access sequence.

k number of copies of the corresponding block h frequency of read accesses, e.g. number of read accesses since a defined starting time s frequency of write accesses, e.g. number of write accesses since a defined starting time p priority. As higher the priority is as faster an access to a certain sequence has to be.

d seek distance. This is the distance from the current position of the disk head (i.e. the position of the end of the previous known access subsequence) to the nearest data arrangement corresponding to the subsequent known access subsequence. The seek distance can be given in % of the disk drive.

d' seek distance between two data arrangements corresponding to the same known access subsequence, which can be given in % of the disk drive.

Parameter Depending on the System:

F free space on the disk media

T transfer rate

D function for converting the seek distance d from % of disk to seconds

The access time t to a sequence S having subsequences $S_i$ in seconds with the method according to the invention can be calculated as follows:

$$t = \sum_i T \cdot g_i + D(d_i) \quad (1)$$

wherein i enumerates all subsequences $S_i$.

The access time $t2_i$ to a sequence S having subsequences $S_i$ in seconds without the method according to the invention is also calculated to:

$$t2 = \sum_i T \cdot g_i + D(d2_i) \quad (2)$$

The computation of the access time t2 is made on the same way as the computation of the access time t, but in the method without the invention the seek distances $d2_i$ are disadvantageously longer than the seek distances $d_i$.

In the method according to the invention the storage costs $m_i$ measured in bytes over all subsequences $S_i$ result in:

$$m = \sum_i g_i \cdot k_i \quad (3)$$

In the conventional method the storage costs $M_i$ in bytes over all subsequences $S_i$ result in:

$$M = \sum_i g_i \quad (4)$$

In the method according to the invention the write costs $w_i$ in seconds can be computed with the following formula:

$$w = k_i \cdot g_i \cdot T + D(d_i) + D(d_i') \cdot (k_i - 1) \quad (5)$$

wherein it is assumed that the entire subsequence is written to the disk drive. Otherwise the size $g_i$ of the subsequence has to be substituted appropriately.

The write costs $W_i$ in seconds without the method according to the invention are:

$$W = g_i \cdot T + D(d_i) \quad (6)$$

With the help of the above mentioned costs a cost function O can be put up:

$$O = \sum_i c_1(p_i, h_i, t_i, t2_i) - c_2(m_i, M_i) - c_3(h_i/s_i, w_i, W_i) \quad (7)$$

wherein:

$$c_1(p, h, t, t2) = C_1 \cdot p \cdot h \cdot (t - t2) \quad (8)$$

$$c_2(m, M) = C_2 \cdot (m/M) \quad (9)$$

$$c_3(r, w, W) = C_3 \cdot r \cdot (w/W) \quad (10)$$

and $C_1$, $C_2$, and $C_3$ are system parameters.

Now, the cost function O can be optimized provided that the free space F>0.

Figure 5:
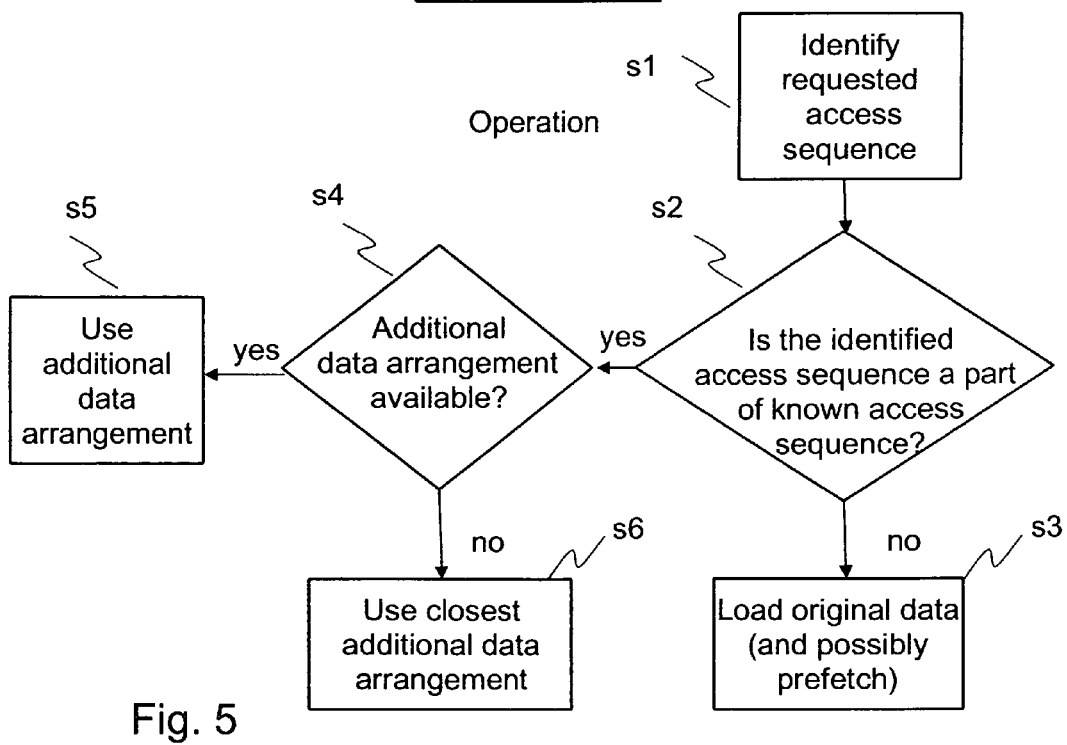
FIG. 5 shows a flow chart of an operation mode of an embodiment of the method according to the invention.

After the preparation mode has been finished it will be switched to operation mode. Tracing—i.e. detecting access sequences requested and providing additional data arrangements for such access sequences if appropriate—may still occur during operation, to allow later improvements, but it is also possible to interleave optimization and access, although that might add complexity to the system. In FIG. 5 a flow diagram of the operation mode of the method according to the invention is depicted. First in step s1, a requested access sequence is identified. Then in step s2, it is checked whether the requested access sequence is a part of a known access sequence. If this is not the case the data are loaded or fetched from the original data arrangement in step s3. In the example of FIG. 1 this would include reading data from data blocks 0 to 7. Otherwise—step s4—it is checked whether an additional data arrangement comprising the determined data sequence is available. If this is the case, this additional data arrangement is used for fetching the desired data according to step s5. Otherwise that additional data arrangement is used whose data sequence is as closest as possible to the determined access sequence, see step s6.

It is helpful to know whether accessing the original data arrangement or the optimized additional data arrangement and if multiple, which one provides the most efficient access given the upcoming access pattern. The following options for predicting whether the original data arrangement or an additional data arrangement shall be used are possible, among others:

1. The application or, for OS start-up, an appropriate OS subcomponent itself signals the OS that it will start an operation. For application start-up, this might be done by a wrapper program, or by using the name of the process originating the read request as the key. This is the preferred way.
2. A second approach is tracking which copy of data requested would be closest to the current location of the read/write head. This performs a greedy optimization of the current head position, however, it may easily fail selecting the optimal trace, for example, when the next data to be accessed can be found at a location relatively close to the current location of the read/write head, many small seeks will be used subsequently, instead of performing a large seek once to a region which contains the entire additional data arrangement in the correct contiguous sequence. To avoid these many small seeks, if the data are not contiguous arranged, a non-zero chance of not picking the closest location of data should be included, to reach a more stable state.
3. A third approach is a modified version of the tracking according to approach 2, but when requesting data which has multiple copies on the medium, the selection unit maintains a set including of all possible locations of such data copies. If the next request or one of the next requests which could be served by multiple copies is contiguous or almost contiguous with any member of the set, it determines the position to be taken. If multiple copies are contiguous, the one closest to the current head position will be chosen to avoid unnecessary seeks.

When a trace has been identified as being a good choice, prefetching of data can be done more aggressively. This is to minimize latency in general and the number of seek operations which could become necessary because other applications might also cause reads in particular or some data of the original data arrangement have been determined not to be copied into an additional data arrangement (see also section "Modification tracking" below).

Care needs to be taken to not have already-cached disk blocks confuse the tracking. Either all accesses, even to cached blocks, need to be tracked, or the existence of a cached block between two uncached blocks needs to make the adjacent blocks considered contiguous.

Modification Tracking:

At the same time as the serialized additional data arrangement is made, modification tracking can be enabled for the original data arrangement. As the original data arrangement continues to be maintained by normal OS functions, modification tracking is preferred, in order to prevent inconsistent read operations, i.e., reads of the additional data arrangement will return a data version not modified compared to the original data arrangement, while the original data arrangement and some other updated addition data arrangements might be rewritten or modified and thus will return up-to-date data. When detecting a write operation, either of two actions can advantageously be taken: The modification is updated in both the original data arrangement and the additional data arrangements; or, the additional data arrangements are invalidated, thereby preventing their contents to be read. The choice between the two functions may be based on multiple factors, such as system policy e.g., whether the read operation is time-critical; the ratio between the frequency of reads from the additional data arrangements and the frequency of writes to the original data arrangement; and/or the number of additional data arrangements.

Multiple Reads of the Same Data within a Trace:

A policy decision can be made if the same data is read multiple times during a single trace. This will generally only happen for very large traces, where limitations in available memory has eliminated a copy of this data from working memory. If limitations in available memory are likely to remain the same for future executions of this particular known access sequence, multiple copies may be advisable.

Autonomic Storage Systems: Disk Caching on the Disk Drive Itself:

For storage systems, it may also be useful for the system to automatically detect some frequent access patterns that involve many seeks and try to optimize them by "caching" the data on disk drive, but in an improved order using the above process.

Computer readable program code or program code in the present context mean any expression, in any language, code or notation, of a set of instructions intended to cause a system having an information processing capability to perform a particular function either directly or after either or both of the following a) conversion to another language, code or notation; b) reproduction in a different material form.

Having illustrated and described advantageous embodiments for novel methods and apparatus, it is noted that variations and modifications in the method and the apparatus can be made without departing from the spirit of the invention or the scope of the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention. Methods may be implemented as signal methods employing signals to implement one or more steps. Signals include those emanating from the Internet, telephonic, electronic or electrical systems, etc.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for reading a physical storage medium, comprising the steps of:
    determining if an access sequence requested by an application to data stored on the medium is part of a known access sequence,
    if the requested access sequence is part of the known access sequence, reading data from a data arrangement stored on the medium in addition to an original data arrangement which additional data arrangement differs in its arrangement of data from an arrangement of data in the original data arrangement.

2. A method according to claim 1, wherein the arrangement of data in the additional data arrangement matches an arrangement of data in the known access sequence.

3. A method according to claim 1, wherein the arrangement of data in the additional data arrangement matches at least partly an arrangement of data in the known access sequence.

4. A method according to claim 1, comprising in a preparation phase:
    determining an access sequence in which data are read by an application from the storage medium as known access sequence, and
    storing an arrangement of data as additional data arrangement on the storage medium, wherein in the additional data arrangement the data are arranged according to the known access sequence.

5. A method according to claim 1, comprising in a preparation phase, for each application:
    determining an access sequence in which data are read by such application from the storage medium as known access sequence, and
    storing an arrangement of data as additional arrangement of data on the storage medium, wherein in the additional arrangement of data the data are arranged according to the known access sequence.

6. A method according to claim 4, wherein each known access sequence is stored together with a link to the corresponding additional data arrangement.

7. A method according to claim 4, wherein the preparation phase is processed repeatedly.

8. A method according to claim 1, wherein an additional data arrangement is only generated, if the amount of data, which has to be rearranged, is below a given threshold.

9. A method according to claim 1, wherein a decision whether an additional data arrangement is generated depends on a desired access time for reading the known access sequence.

10. A method according to claim 1, wherein a decision whether an additional data arrangement is generated depends on the priority an access to the data of the known access sequence has.

11. A method according to claim 1, wherein if a write operation to data being subject to an additional data arrangement occurs either the original data arrangement and the additional data arrangement are modified or the original data arrangement is modified and the additional data arrangement is marked.

12. A physical computer program element comprising program code stored and tangibly embodied on computer readable medium for causing steps of a method according to claim 1 to be executed when said program is run on a processing unit.

13. A device for reading a storage medium, comprising:
    an evaluation unit for determining if an access sequence requested by an application to data stored on the medium is part of a known access sequence, and
    an execution unit for reading data from a data arrangement stored on the medium in addition to an original data arrangement, if the requested access sequence is part of a known access sequence, which additional data arrangement differs in its arrangement of data from the arrangement of data in the original data arrangement.

14. A device according to claim 13, further comprising a selection unit for selecting one of more data arrangements stored on the medium in addition to an original data arrangement which additional data arrangements differ in their arrangement of data from the arrangement of data in the original data arrangement.

15. A device according to claim 13, further comprising a unit for generating an additional data arrangement, wherein the data in the additional data arrangement are arranged in an access sequence as requested by an application.

16. A method according to claim 1, further comprising in a preparation phase:

determining an access sequence in which data are read by an application from the storage medium as known access sequence, and storing an arrangement of data as additional data arrangement on the storage medium, wherein in the additional data arrangement the data are arranged according to the known access sequence, and wherein:

each known access sequence is stored together with a link to a corresponding additional data arrangement;

the preparation phase is processed repeatedly;

an additional data arrangement is only generated, if the amount of data, which has to be rearranged, is below a given threshold;

the decision whether an additional data arrangement is generated depends on a desired access time for reading the known access sequence; and if a write operation to data being subject to an additional data arrangement occurs either the original data arrangement and the additional data arrangement are modified or the original data arrangement is modified and the additional data arrangement is marked.

17. A physical and tangible computer program product comprising a computer readable medium having computer readable program code means embodied therein for causing functions of a device for reading a storage medium, the program code is stored on a computer readable medium and the computer readable program code means causing a computer to effect all functions of claim 13.

18. A physical and tangible article of manufacture comprising a computer readable medium having computer readable program code means embodied therein for causing the reading of the storage medium, the program code is stored on a computer readable medium and the computer readable program code means in said article of manufacture comprising computer readable program code means for causing a computer to effect the steps of:

determining if an access sequence requested by an application to data stored on the medium is part of a known access sequence, if the requested access sequence is part of the known access sequence, reading data from a data arrangement stored on the medium in addition to an original data arrangement which additional data arrangement differs in its arrangement of data from an arrangement of data in the original data arrangement.

19. An article of manufacture as recited in claim 18, the computer readable program code means in said article of manufacture farther comprising in a preparation phase computer readable program code means for causing a computer to effect:

determining an access sequence in which data are read by an application from the storage medium as known access sequence, and storing an arrangement of data as additional data arrangement on the storage medium, wherein in the additional data arrangement the data are arranged according to the known access sequence, and wherein:

each known access sequence is stored together with a link to a corresponding additional data arrangement;

the preparation phase is processed repeatedly;

an additional data arrangement is only generated, if the amount of data, which has to be rearranged, is below a given threshold;

the decision whether an additional data arrangement is generated depends on a desired access time for reading the known access sequence; and if a write operation to data being subject to an additional data arrangement occurs either the original data arrangement and the additional data arrangement are modified or the original data arrangement is modified and the additional data arrangement is marked.

20. A device according to claim 13, further comprising a preparation phase unit comprising:

means for determining an access sequence in which data are read by an application from the storage medium as known access sequence, and means for storing an arrangement of data as additional data arrangement on the storage medium, wherein in the additional data arrangement the data are arranged according to the known access sequence, and wherein:

each known access sequence is stored together with a link to a corresponding additional data arrangement;

an additional data arrangement is only generated, if the amount of data, which has to be rearranged, is below a given threshold;

a decision whether an additional data arrangement is generated depends on a desired access time for reading the known access sequence; and if a write operation to data being subject to an additional data arrangement occurs either the original data arrangement and the additional data arrangement are modified or the original data arrangement is modified and the additional data arrangement is marked.

* * * * *